March 4, 1958 — P. B. MITCHELL — 2,825,781
CONTROL APPARATUS
Filed Aug. 4, 1954 — 4 Sheets-Sheet 1
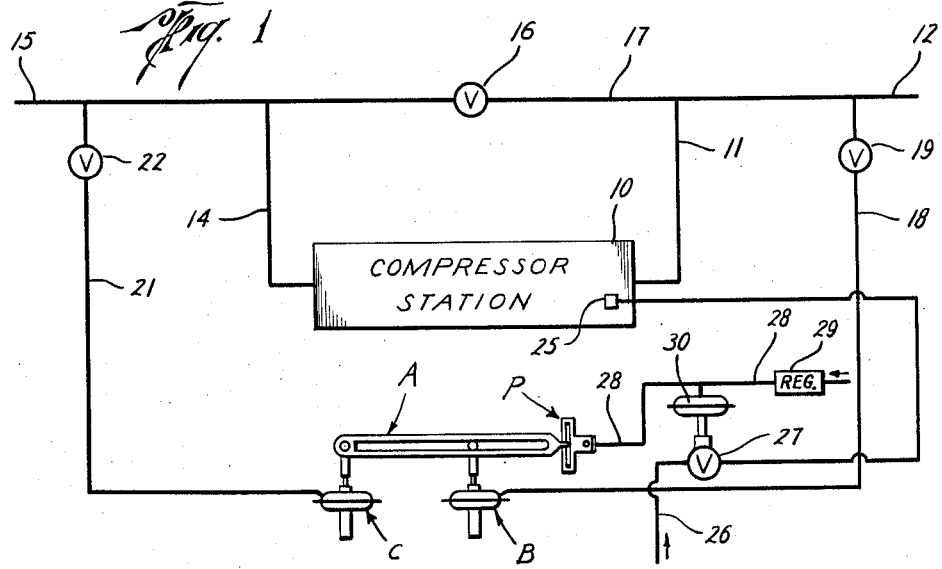
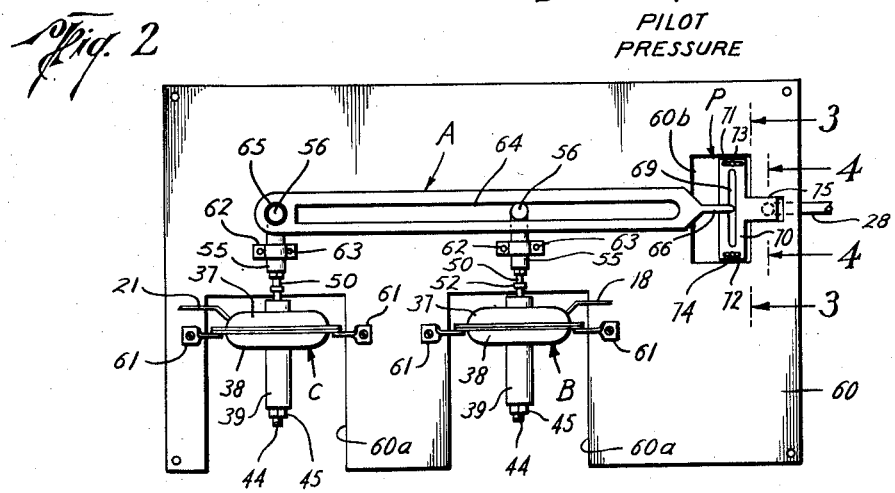
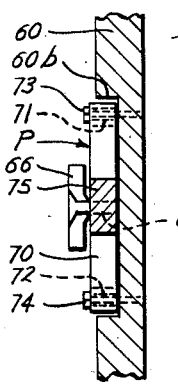
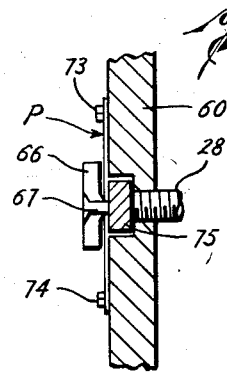
Presse B. Mitchell
INVENTOR.
BY J. Vincent Martin
Joe E. Edwards
B. R. Pravel
ATTORNEYS

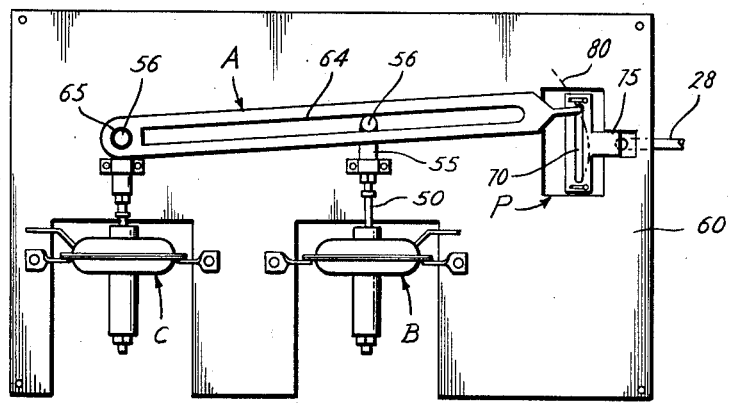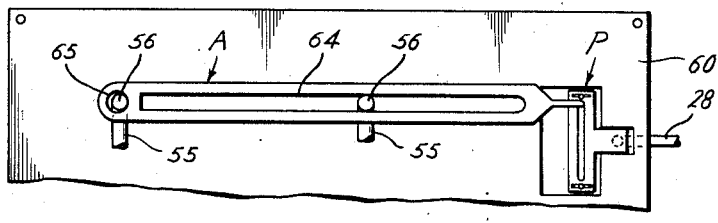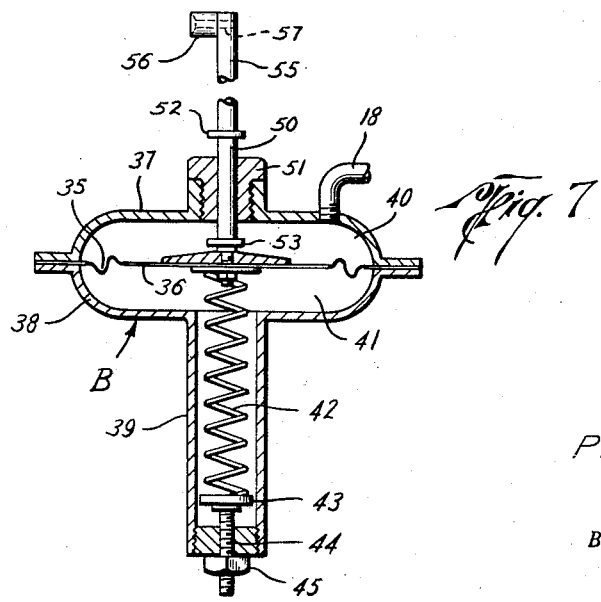

March 4, 1958
P. B. MITCHELL
2,825,781
CONTROL APPARATUS
Filed Aug. 4, 1954
4 Sheets-Sheet 3
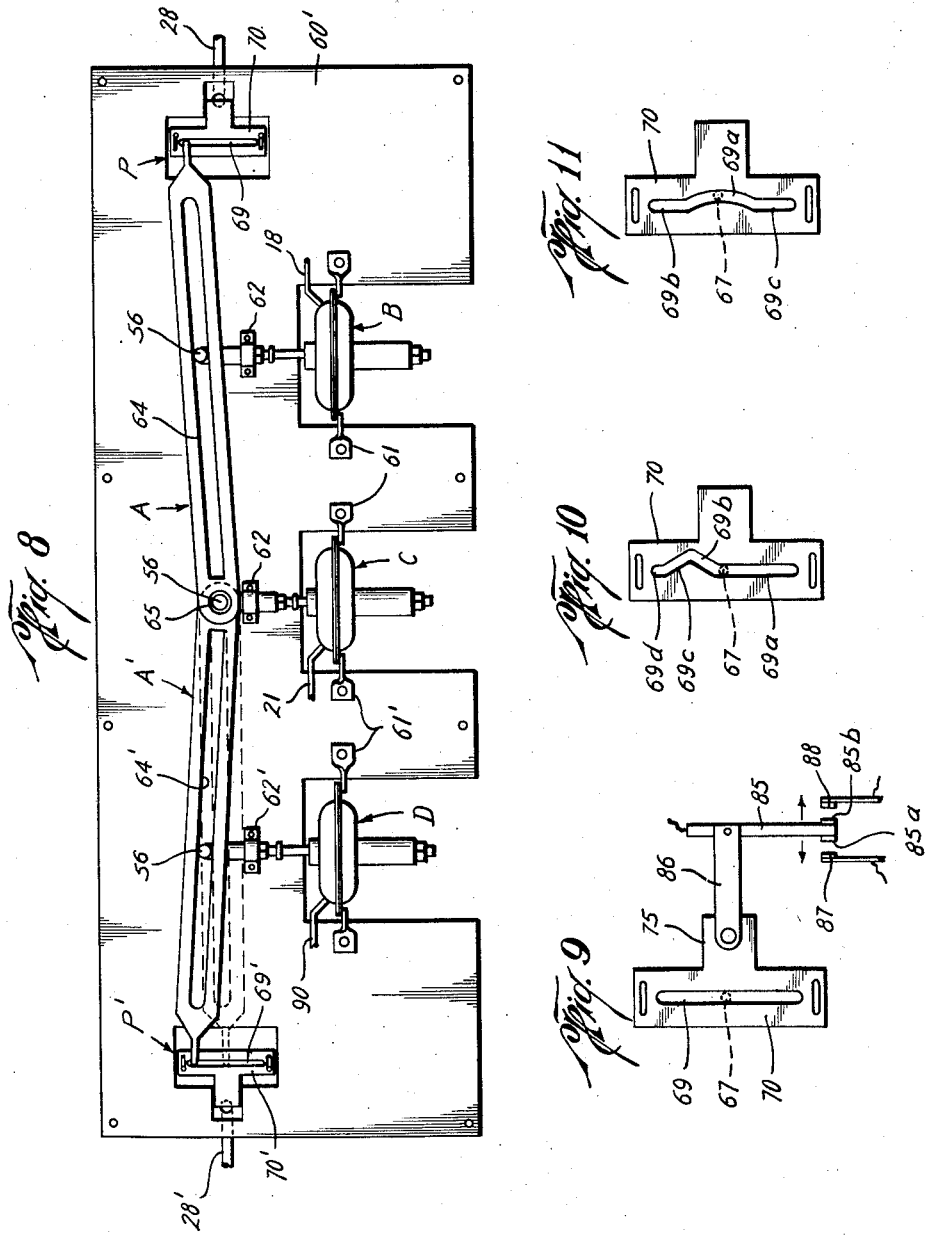
Presse B. Mitchell
INVENTOR.
BY J. Vincent Martin
Joe E. Edwards
B. R. Pravel
ATTORNEYS

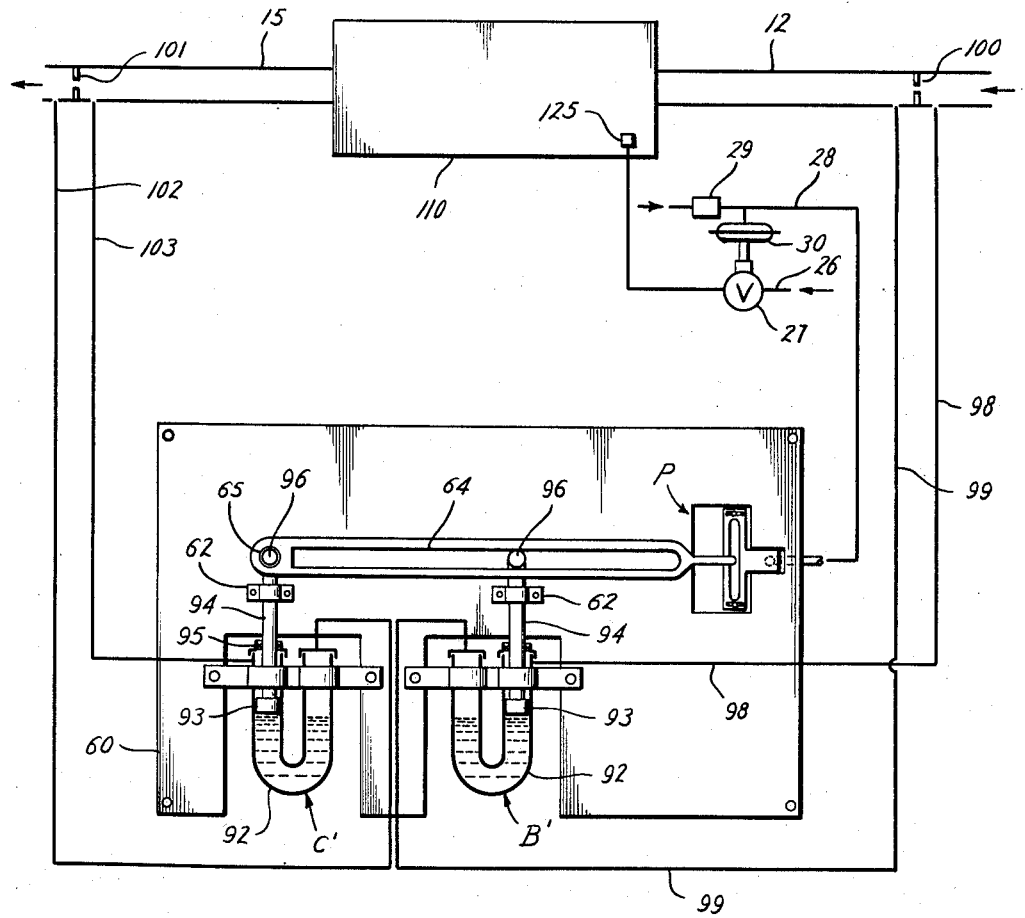

United States Patent Office 2,825,781
Patented Mar. 4, 1958

2,825,781
CONTROL APPARATUS
Presse B. Mitchell, Sarepta, La.
Application August 4, 1954, Serial No. 447,852
10 Claims. (Cl. 200—81.5)

This invention relates to new and useful improvements in control apparatus.

An object of this invention is to provide a new and improved control apparatus for controlling the operation of various types of equipment in accordance with the pressure, velocity or other condition of a flowing fluid.

An important object of this invention is to provide a new and improved control apparatus which is adapted to be operated in accordance with changes in a predetermined pressure differential between the inlet side and the outlet side of a compressor unit or similar equipment to prevent overloading and other inefficient operation of the compressor unit or other equipment.

Another important object of this invention is to provide a new and improved control apparatus which is adapted to be actuated in accordance with changes in a predetermined fluid flow rate differential between the inlet side and the outlet side of a piece of equipment such as a compressor unit.

Another object of this invention is to provide a new and improved control apparatus, wherein an operating beam is pivotally connected to at least two fluid-responsive members which are adapted to effect a movement of the beam in accordance with changes, in one or more conditions of a flowing fluid.

A further object of this invention is to provide a control apparatus, wherein two or more operating means are pivotally connected to fluid-responsive members for the actuation or operation of a plurality of devices, the control or operation of such devices being co-ordinated by reason of the pivotal connection of the beams with a common fluid-responsive device.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a diagrammatic view illustrating the control apparatus of this invention connected in an arrangement for controlling pressure conditions in one type of equipment.

Figure 2 is an elevation illustrating the control apparatus of this invention.

Figure 3 is a sectional view taken on line 3—3 of Figure 2.

Figure 4 is a sectional view taken on line 4—4 of Figure 2.

Figure 5 is a view similar to Figure 2, but illustrating the control apparatus of this invention after it has been actuated to a different position from that illustrated in Figure 2.

Figure 6 is a view illustrating a portion of the device shown in Figure 5, but illustrating a changed position of the control apparatus.

Figure 7 is a view, partly in elevation and partly in section, illustrating the details of one type of fluid-responsive member used in the control apparatus of this invention.

Figure 8 is an elevation illustrating a modified form of the control apparatus illustrated in Figures 1–7.

Figure 9 is an elevation illustrating a modification of the control plate assembly of the control apparatus of this invention, and illustrating in particular an electrical arrangement for transmitting the control operation to the equipment to be controlled.

Figure 10 is an elevation illustrating a modification of the slot construction of the control plate.

Figure 11 is a view similar to Figure 10, but illustrating still another modification of the slot in the control plate.

Figure 12 is a diagrammatic view of a modified form of the control apparatus of this invention, wherein the apparatus is operated in accordance with variations in a predetermined fluid flow rate differential.

In the drawings, the letter A designates an operating beam which is pivotally connected to fluid-responsive members or devices B and C. As will be explained, the fluid-responsive devices B and C are actuated in accordance with changes in one or more conditions of a flowing fluid and they transmit their movements to the beam A to effect a movement of a switch means P. The movement of the switch means P effects an operation or control of any desired equipment.

For example, in Figure 1 of the drawings, one form of the control apparatus of this invention is illustrated as connected to a compressor 10 which is illustrated schematically. The compressor 10 has an inlet pipe or line 11 connected thereto which is in communication with the main inlet flow pipe 12. The compressor 10 also has an outlet pipe or line 14 which is connected to the main outlet pipe 15. Actually, the inlet pipe 12 and the outlet pipe 15 are the same pipe in most instances, but a valve 16 is positioned so that, when such valve 16 is closed, fluid will flow from the inlet line 12 through the inlet line 11 to the compressor 10 and then therefrom through the line 14 to the main outlet pipe 15. However, when the valve 16 is open, the flow of fluid is by-passed through the by-pass pipe 17 between the inlet line 11 and the outlet line 14.

The control apparatus, Figure 1 is connected to the compressor 10 by a connecting pipe 18 which connects from the inlet pipe 12 to the fluid-responsive device B. A valve 19 is provided to control the flow from the inlet pipe 12 to the line 18. The other fluid-responsive device C has a connecting pipe 21 joined to the main outlet pipe 15, and a valve 22 is provided to control the fluid communication between the device C and the outlet pipe 15. Thus, with the particular installation illustrated in Figure 1, the fluid-responsive device B is in fluid communication with the inlet pipe 12, and the fluid-responsive device C is in fluid communication with the outlet pipe 15.

Generally speaking, the changes in the inlet and outlet pressures effect corresponding changes in the fluid-responsive devices B and C, and such changes are reflected in the movement of the beam A, which, in turn, effects a movement of the switch means P, as above mentioned. In the example shown in Figure 1, the switch means P serves to operate a suction valve 25 on the power end of the compressor which is connected thereto in a conventional manner to relieve the load on such compressor under certain desired conditions. The suction valve 25 is supplied with a pilot air or gas pressure for actuating same through a flow line 26 which has a motor-actuated valve 27 mounted therein, such valve 27 being of conventional motor valve construction. The valve 27 is normally maintained closed by maintaining a constant fluid pressure acting thereon and supplied from a fluid line 28 through a pressure regulator 29 to a diaphragm 30 on the valve 27. So long as the pressure from the line 28 to the diaphragm 30 is maintained constant (generally a pilot pressure of about fifteen pounds per square inch), the valve 27 is maintained in its closed position, but when the pressure in the diaphragm 30 from the line 28 is reduced for any reason, the valve 27 will open to permit the fluid pressure from the line 26 to flow to the suction valve 25. With the particular installation illustrated in Figure 1, the line 28 is connected to the control apparatus of this invention, and, upon predetermined movement of the control plate P, as will be explained, the pressure of the fluid in the line 28 is caused to drop or be reduced so that the valve 27 is actuated to an open position to thereby operate the suction valve 25.

Referring now to the details of the control apparatus of this invention, the details of the one type of fluid-responsive member or device B is illustrated in Figure 7, wherein the device B includes a circular flexible diaphragm 35 having a central rigid disk 36 connected thereto. The outer circumferential portion of the diaphragm 35 is tightly clamped between the flanges of an upper housing member 37 and a lower housing member 38, so that the diaphragm 35 divides the chamber formed by the upper member 37 and the lower member 38 into an upper pressure chamber 40 and a lower spring chamber 41. The upper pressure chamber 40 is in fluid communication with the inlet pressure from line 12 (Figure 1) through the pipe 18 connected thereto. The diaphragm 36 is maintained in a predetermined position for a predetermined fluid pressure acting thereon by means of a coil spring 42 or any other similar resilient means which is adapted to contact the lower portion of the disk 36 so as to urge the diaphragm 35 upwardly when the pressure in the upper chamber 40 falls below the predetermined amount. The lower end of the spring 42 rests upon a circular plate 43 connected to a threaded adjusting rod 44, which extends through the lower end of a housing extension 39 depending from the lower housing member 38. The movement of the adjusting screw 44 longitudinally with respect to the housing extension 39 effects a compression or extension of the spring 42 to vary the extent of the spring action on the diaphragm 35. A nut 45 is threaded on the adjusting screw 44 to lock the screw 44 in its predetermined and set position.

The upper end of the disk 36 has a transmitting rod 50 connected thereto by any suitable means and extending upwardly therefrom through a guide bushing 51 mounted in the upper central portion of the upper housing member 37. The rod 50 is adapted to be moved upwardly and downwardly in accordance with pressure in the chamber 40. An upper stop ring 52 and a lower stop ring 53 are mounted on the rod 50 to determine the upper and lower limits of the movement of the rod 50. Such stop rings 52 and 53 can of course be adjustably mounted on the rod 50 so as to readily vary the limits of longitudinal movement of the rod 50. The upper end of the rod 50 has an enlarged rod extension 55 connected thereto (Figures 2 and 7), and such extension 55 has a cylindrical pivot pin 56 extending laterally therefrom at a right angle and connected thereto by means of a screw 57 or other similar securing means (Figure 7).

The fluid-responsive device or member B is mounted on a panel or support member 60 (Figure 2) by means of brackets 61, which are fastened to the support member 60 and extend beneath the flanges of the housing members 37 and 38 and, preferably, are attached by means of bolts or other connecting means (not shown). The enlarged rod extension 55 projects through a U-shaped guide bracket 62, which is secured to the panel or support 60 by screws 63 or any other suitable securing means, whereby during longitudinal movement of the rod 50 and its enlarged portion 55 relative to the panel 60, the rod 50 and extension 55 are prevented from moving out of axial alignment.

The cylindrical pivot pin 56 is illustrated in Figure 7 as if viewed from the side of Figure 2, but it will be evident that the pin 56 actually extends into an open slot 64 of the beam A for transmitting the longitudinal movements of the rod 50 to the beam A.

The fluid-responsive device or member C is identical in all aspects with the fluid-responsive device B, and, therefore, like numerals identify like parts in both devices, but as previously mentioned, the fluid line 18 is connected to the device B whereas the fluid line 21 is connected to the device C. The device C is also mounted on the panel or support 60 in the same manner as the device B, except that the pin 56 of the device C is positioned at the left-hand end of the beam A in a circular opening 65 (Figure 2). It will be noted that the panel 60 has open portions 60a through which the major portions of the fluid-responsive devices B and C extend in their mounted positions.

The right-hand end of the beam A (Figure 2) has thereon a laterally extending arm 66 with a downwardly or inwardly extending projection 67 connected to its outer end (Figure 3). The projection 67 extends into a longitudinal slot 69 formed in control plate 70 of the switch P. The control plate 70 also has upper and lower lateral slots 71 and 72, respectively, into which guide pins 73 and 74 extend from the panel or support 60 (Figure 3). The guide pins 73 and 74 prevent the plate 70 from moving in any direction except a lateral direction, and if desired, the plate 70 may be positioned in a recess 60b in the panel 60 to assist in maintaining the control plate 70 against shifting during its lateral movement. The control plate 70 is provided with an extension or projection 75, which is adapted to cover the open end of the flow line 28, which extends into the rear of the panel 60 (Figures 2 and 4). As the control plate 70 is moved laterally, the projection 75 is moved with respect to the open end of the pipe 28, so as to cover or uncover same, depending upon the direction of the lateral movement. As illustrated in the drawings, a lateral movement to the left results in an opening of the line 28, whereas a lateral movement of the plate P to the right results in a closing of the line 28 (Figure 2). The projection 75 therefore serves as a valve member to open and close the line 28 in the installation illustrated in Figure 1.

In the operation or use of the control apparatus of this invention in the installation illustrated in Figure 1, the control apparatus serves to maintain the compressor 10 under proper load conditions for maximum efficiency by regulating or controlling the compressor in accordance with the pressure differential between the inlet and the outlet ends of the compressor. Assuming that the pressure differential across the compressor 10 is to be maintained at about fifty pounds per square inch in order to obtain maximum efficiency, with an inlet pressure of one hundred and eighty-five pounds per square inch the outlet pressure should be two hundred and thirty-five pounds per square inch. Accordingly, the fluid-responsive member B is adjusted, by adjusting the set screw 44, so that the diaphragm 35 is balanced when the pressure from line 18 is one hundred and eighty-five pounds per square inch, when the pressure drops below such amount, then the spring acts to urge the shaft or rod 50 upwardly. Similarly, the fluid-responsive device C is set to remain inactive when the pressure is two hundred and thirty-five pounds per square inch in the line 21 and the outlet pipe 15, but, when such discharge or outlet pressure is reduced, the spring in the device C acts to urge the rod thereof upwardly.

With the fluid conditions initially in the above relationship, the beam A is in a horizontal position (Figures 1 and 2), and the control plate 70 of the switch means P is in the extreme right-hand position (Figure 2), so that the fluid flow line 28 is closed. When the inlet pressure 12 drops below one hundred and eighty-five pounds per square inch, the spring 42 in the device B acts to urge the rod 50 and the extension 55 upwardly, and such upward movement is transmitted to the operating beam B by reason of the pivotal connection of the pin 56 in the lateral slot 64 of the beam A. As the beam A is moved upwardly by the device B to an inclined position (Figure 5), the pin 56 of the device C serves as a pivot point about which the beam A moves and the projection 66 with the pin 67 thereon moves in an arc designated by the dash-dot line 80 in Figure 5, so that the pin 67 moves upwardly but also laterally to the left (Figure 5).

As the projection 66 and the pin 67 connected thereto are moved in the arc 80 (Figure 5), and therefore laterally to the left, the pin 67 moves in the slot 69 of the control plate 70 and effects the lateral movement of such plate 70 to thereby open or expose the open end of the line 28 leading from the diaphragm 30 of the valve 27. The motor valve 27 is therefore actuated to open the flow of the pilot gas pressure through the line 26 to the suction valve 25, and the suction valve 25 is operated at the compressor station to relieve the load on the compressor 10.

The beam A is maintained in its inclined position shown in Figure 5, and the valve 27 is maintained open by reason of the position of the control plate 70 so long as the inlet fluid pressure is below the predetermined amount, and so long as the outlet pressure at the line 15 remains constant at its predetermined value, for example, two hundred and thirty-five pounds per square inch. However, in the event that the outlet pressure in the line 15 drops below two hundred and thirty-five pounds per square inch, then the device C is actuated to move the pin 56 thereof upwardly and to thereby move the left-hand end of the beam A upwardly until it is parallel with but above its original position (Figure 6). As the beam A moves to its horizontal raised position, shown in Figure 6, the beam A is moved to the right, and such movement to the right effects a similar movement of the control plate 70 to the right to close the flow line 28 which results in a closing of the suction valve 25.

When the pressure in the inlet line 12 increases, the beam A will, of course, move downwardly, and, when the inlet and outlet pressures are again the same as they were initially, the beam A will be in its original horizontal position (Figure 2). It should be noted that the beam A may assume a horizontal position at various intervals between the neutral position (Figure 2) and the fully raised position (Figure 6) because even though the inlet and outlet pressures vary, the beam A will be horizontal when the pressure differential is at the predetermined amount.

Although the control apparatus has been described above with the switch means including the control plate 70 to operate the opening and closing of the fluid line 28, it will be evident that such control plate 70 can be used for moving various mechanical or electrical arrangements so as to control the operation of the equipment. For example, in Figure 9 the control plate 70 is illustrated with an electrical contact arm 85 connected thereto by a rigid extension 86 from the projection 75 of the plate 70. Such member 85 has contact elements 85a and 85b, which are adapted to contact fixed electrical contact elements 87 and 88, respectively. When the electrical contacts 85a and 87 are engaged, one electrical circuit is closed, while another electrical circuit is closed when the electrical contacts 85b and 88 are engaged. When the electrical contact support 85 is positioned midway between the electrical contacts 87 and 88, as illustrated in Figure 9, then both of the two electrical circuits are open, and such would be the condition when the beam A is in the neutral or horizontal position by reason of the equipment operating in the desired range or manner. Each of such electrical circuits include various electrical motors or other electrical devices for effecting the regulation of the equipment to which the control apparatus of this invention is connected. For example, the suction valve 25 illustrated in Figure 1 could be operated by an electrical means such as an electrically driven motor (not shown) rather than by fluid pressure as previously described.

In Figure 8, a modified form of the control apparatus illustrated in Figures 1-7 is shown, wherein a second operating beam A' is used in addition to the beam A. The fluid-responsive members B and C are identical with the devices B and C illustrated in Figure 2 and are connected to the beam A in the same manner. Also, the switch means P is connected to the beam A in the same manner for controlling the opening and closing of the exposed end of the line 28, or any other suitable arrangement, such as the electrical arrangement shown in Figure 9. The beam A' is identical with the beam a, except that it is mounted in reverse position with respect to the beam A, so that its right-hand end is pivotally connected to the pin 56 of the fluid-responsive member C. A third fluid-responsive device or member D is connected to the beam A' at substantially the same position as the member B is connected to the beam A. The member D is identical with the member B, except that ordinarily it is set to operate at a different pressure range and is, therefore, connected to a different fluid line 90. The switch means P' is identical with the switch means P, except that it is positioned in reverse and it controls a separate flow line 28'. The panel or support for the structure shown in Figure 8 is substantially the same as that illustrated in Figure 2, except for the additional area required, and such panel is designated by the numeral 60'.

The operation of the form of the invention shown in Figure 8 is similar to that of the device shown in Figure 2, except that two control operations are obtained. The modification of Figure 8 is particularly suitable for an arrangement wherein the fluid-responsive device C is connected to a common outlet or other flow line, while the fluid-responsive members B and D are connected to several separate inlet or flow lines. With such an arrangement, when a change in the inlet pressure flowing through line 18 to the device B occurs, the switch P will be actuated as explained above in connection with the device of Figure 2 to open the line 28 or to operate an electrical circuit such as shown in Figure 9. Similarly, when a change in the inlet line flowing through line 90 to the device D occurs, the beam A' is raised and pivoted about the pin 56 of the fluid-responsive device C to operate the switch P'. When the outlet pressure which is in communication with the flow line 21 connected to the central or common fluid-responsive device C decreases, then the pin 56 of the device C is moved upwardly to position the beams A and A' in a substantially horizontal position again to thereby close the switches P and P'. It will be evident that various operations and sequences of operation can occur with this modification, particularly since various types of control plates 70 such as shown in Figures 9-11 can be used in the device of Figure 8, as will be explained.

In Figures 10 and 11 two different modifications of the control plate 70 are illustrated, with the only change therein being the shape of the slot 69. In Figure 10 the slot 69 has a lower substantially vertical portion 69a, an upwardly and outwardly inclined portion 69b, an upwardly and inwardly inclined portion 69c, and an upper substantially vertical portion 69d. Assuming the pin 67 is in the dotted line position shown in Figure 10 when the beam A is in a neutral substantially horizontal position, when the beam A moves to an inclined position, such as illustrated in Figure 5, the pin 67 moves first into the upwardly and outwardly inclined portion 69b of the slot, and, therefore, the control plate 70 is moved very quickly to the left, so as to open fully with a quick-opening action the flow line 28. As the pin 67 moves into the upwardly and inwardly inclined portion 69c, the pin 67 does not affect the movement of the plate 70, and the pin finally stops when it reaches the portion 69d of the slot. When the beam A moves downwardly to move the pin 67 downwardly from its dotted line position, illustrated in Figure 10, the plate 70 will be moved gradually away from the open end of the flow pipe 28, as was the case with the form of the control plate 70 illustrated in Figures 1–7.

In Figure 11 the slot 69 is formed with a central arcuate portion 69a and an upper vertical portion 69b and a lower vertical portion 69c. The pin 67 is diagrammatically positioned at the midpoint of the arcuate central portion 69a when the beam A is positioned horizontally. When the beam A moves upwardly, the arc or curvature of the portion 69a is such that the movement of the pin 67 does not effect any movement of the control plate 70 until the pin 67 has moved into the vertical position 69b at the upper end of the slot. When movement of the pin 67 into the upper vertical slot portion 69b occurs, the control plate 70 is moved rapidly to an open position. A similar action occurs when pin 67 moves into the lower vertical portion 69c.

Although several configurations and shapes of the slot 69 in the control plate 70 have been illustrated, it will be appreciated that other configurations and shapes can be employed depending upon the type of operation or the sequence of operational steps desired with the control apparatus.

In Figure 12 another modification of the control apparatus of this invention is illustrated wherein the fluid-responsive devices are of a different type than that illustrated in Figures 1–8. The devices B' and C' are adapted to be operated in response to, or in accordance with, changes or variations in the flow rates of the fluid at the fluid source connected to each of the devices B' and C', as will be explained.

The operating beam A and the switch P of this modification are the same as illustrated in Figure 2, and the control device may be connected to a measuring station 110 or any suitable equipment. The device B' and C' are identical and each includes a U-shaped tube 92 having mercury therein. In one of the legs of the tube 92, a float 93 of iron or steel is disposed on the upper surface of the mercury. A rod 94 on the float 93 extends upwardly through a packing gland 95 and a pivot pin 96 extends laterally into the groove 64 (device B') or the opening 65 (device C'). The brackets 62 maintain the rods 94 in axial alignment as they move up and down. Each tube 92 is supported on the panel or support 60 by brackets 97 which may be of any suitable construction but are preferably similar to the brackets 61 of Figure 2.

The fluid-responsive device B' is connected to the fluid inlet pipe 12 by an upstream line 98 and a downstream line 99. The upstream line 99 is connected to the pipe 12 upstream from an orifice plate 100 in the pipe 12 and the line 99 is connected downstream therefrom. The line 98 is connected to the upper end of one leg of the tube 92 of the device B' and above the piston 93 and the line 99 is connected to the upper end of the other leg of such tube 92 and above the level of the mercury in the tube. The orifice plate 100 acts in the usual manner to create a pressure drop thereacross which is reflected in the pressure differential between the lines 98 and 99. As the rate of flow of the fluid in the pipe 12 varies, the pressure differential across the plate 100 changes to thereby change the position of the piston 93 in the tube 92.

The device C' is operated in the same manner except that it is connected across an orifice plate 101 in pipe 15 by means of a downstream line 102 and an upstream line 103. It is therefore believed evident that when the rate of the flow of the fluid in line 12 or line 15 changes, such change is reflected by a movement of the beam A in the same manner as the beam A of Figures 1 and 2 moves in response to the movements of the devices B and C to operate the valve 125 or similar equipment.

It should be pointed out that the Figure 12 modification could be constructed with an additional operating beam and the other parts associated therewith in the same arrangement illustrated in Figure 8, except for the operation in accordance with fluid flow rate rather than fluid pressure. Also, it will be understood that other types of fluid-responsive devices could be used instead of those illustrated; for example, Bourdon tubes would be satisfactory.

The foregoing disclosure and description of the invention is illustrative and explanatory thereof and various changes in the size, shape, and materials, as well as in the details of the illustrated construction may be made, within the scope of the appended claims, without departing from the spirit of the invention.

What is claimed is:

1. In a control apparatus, an operating beam, a plurality of fluid-responsive devices, each of said fluid-responsive devices including a chamber having a flexible diaphragm dividing said chamber into a fluid pressure compartment and a spring compartment, and an actuating rod connected to said diaphragm and movable therewith in accordance with fluctuations in the pressure in said pressure compartment, means connecting said devices to said beam for transmitting movements of said devices to said beam, means establishing fluid communication between each of said devices and a separate fluid source for effecting movements of said devices in accordance with changes in at least one of the conditions of the fluid at the fluid source, and switch means connected to said beam and adapted to be actuated in response to the movement of said beam.

2. In a control apparatus, an operating beam, a plurality of fluid-responsive devices, each of said fluid-responsive devices including a chamber having a flexible diaphragm dividing said chamber into a fluid pressure compartment and a spring compartment, and an actuating rod connected to said diaphragm and movable therewith in accordance with fluctuations in the pressure in said pressure compartment, means connecting said devices to said beam for transmitting movements of said devices to said beam including a transversely extending pin on each rod engageable with said beam, means establishing fluid communication between each of said devices and a separate fluid source for effecting movements of said devices in accordance with changes in at least one of the conditions of the fluid at the fluid source, and switch means connected to said beam and adapted to be actuated in response to the movement of said beam.

3. In a control apparatus, an operating beam, a plurality of fluid-responsive devices spaced laterally from each other below said beam, each of said fluid-responsive devices including a chamber having a flexible diaphragm dividing said chamber into a fluid-pressure compartment and a spring compartment, said means establishing fluid communication with each of said devices being connected to said fluid pressure compartment to transmit fluid pressure variations to said diaphragm, and a spring in said spring compartment acting on said diaphragm in opposition to the fluid pressure in said fluid pressure compartment, said beam being elongate and normally extending substantially horizontally, pivot means connecting said devices to said beam for transmitting movements of said devices to said beam to effect an inclination of said beam as said devices move with respect to each other, means establishing fluid communication between each of said devices and a separate fluid source for effecting movements of said devices in accordance with changes in at least one of the conditions of the fluid at the fluid source, and switch means connected to said beam and adapted to be actuated in response to the movement of said beam from the horizontal to the inclined position, and vice versa.

4. A control apparatus, comprising a pair of operating beams, a plurality of fluid-responsive devices including a common fluid-responsive device connected to both of said beams, and at least one other fluid-responsive device for each of said beams, each of said fluid-responsive devices being independently movable in accordance with changes in fluid pressures acting thereon, and a switch means connected to each of the beams and operable simultaneously by movement of said common device but operable independently when said common device remains stationary and one of the other fluid-responsive devices moves.

5. A control apparatus comprising, a floating beam, means connecting the beam to a switch and permitting lateral movement of the beam without energizing the switch and energizing the switch with longitudinal movement of the beam, a pair of fulcrums supporting the beam, one of the fulcrums holding the beam against longitudinal movement relative to said one fulcrum, and separate fluid responsive means connected to each fulcrum and reciprocating the fulcrums along parallel axes extending laterally of the beam in response to changes in a condition of the fluid to which the devices are exposed, whereby equal movement of the fulcrums by the fluid responsive means will not operate the switch and unequal movement of the fulcrums will cause rotation of the beam about said one fulcrum and effect a longitudinal movement of the beam relative to the switch.

6. A control apparatus comprising, a floating beam, means connecting the beam to a switch and permitting lateral movement of the beam without energizing the switch and energizing the switch with longitudinal movement of the beam, a pair of fulcrums supporting the beam, one of the fulcrums holding the beam against longitudinal movement relative to said fulcrum and the other permitting longitudinal movement relative to the other fulcrum, and separate fluid responsive means connected to each fulcrum and reciprocating the fulcrums along parallel axes extending laterally of the beam in response to changes in a condition of the fluid to which the devices are exposed, whereby equal movement of the fulcrums by the fluid responsive means will not operate the switch and unequal movement of the fulcrums will cause rotation of the beam about said one fulcrum and effect a longitudinal movement of the beam relative to the switch.

7. A control apparatus comprising, a pair of fluid responsive devices each having an actuating rod reciprocal with changes in a condition of the fluid to which the devices are exposed, said devices mounted to maintain the reciprocating axes of the rods parallel, an operating beam extending transversely of said axes and pivotally connected to each actuating rod, one of said pivotal connections holding a beam against a longitudinal movement relative to one of the actuating rods, each of said pivots providing a fulcrum about which the beam may rotate with reciprocation of the actuation rods in unequal amounts, and switch means connected to said beam with a slotted pivot permitting relative sliding movement between the switch means and beam in a direction substantially parallel to said axes, said switch means operable by longitudinal movement of the beam relative thereto.

8. A control apparatus comprising, a pair of fluid responsive devices each having an actuating rod reciprocal with changes in a condition of the fluid to which the devices are exposed, said devices mounted to maintain the reciprocating axes of the rods parallel, an operating beam extending transversely of said axes and pivotally connected to each actuating rod, one of said pivotal connections permitting relative sliding movement between an actuator rod and the beam in a direction longitudinally of the beam, the other of said pivotal connections holding the beam against longitudinal movement relative to the other actuating rod, each of said pivots providing a fulcrum about which the beam may rotate with reciprocation of the actuation rods in unequal amounts, and switch means connected to said beam with a slotted pivot permitting relative sliding movement between the switch means and the beam in a direction substantially parallel to said axes, said switch means operable by longitudinal movement of the beam relative thereto.

9. The apparatus of claim 8 wherein the fluid means are diaphragms.

10. The apparatus of claim 9 wherein the fluid means are U-tubes each exposed to fluid in a line on opposite sides of spaced restrictions in the line, and the actuator rods are carried by floats supported by liquid in the U-tubes.

References Cited in the file of this patent

UNITED STATES PATENTS

| | | |
|---|---|---|
| 397,657 | Meyer | Feb. 12, 1889 |
| 630,616 | Marshall | Aug. 8, 1899 |
| 672,320 | Ford | Apr. 16, 1901 |
| 810,308 | Salzer | Jan. 16, 1906 |
| 2,063,613 | McCarthy | Dec. 8, 1936 |
| 2,141,227 | Schaefer | Dec. 27, 1938 |
| 2,143,537 | Bliss | Jan. 10, 1939 |
| 2,187,061 | Smith | Jan. 16, 1940 |
| 2,230,056 | Hill | Jan. 28, 1941 |
| 2,373,042 | Martindell | Apr. 3, 1945 |
| 2,406,246 | Ogden | Aug. 20, 1946 |
| 2,586,972 | McKenzie | Feb. 26, 1952 |
| 2,648,016 | Van Castle | Aug. 4, 1953 |

FOREIGN PATENTS

| | | |
|---|---|---|
| 574,756 | Great Britain | Jan. 18, 1946 |